United States Patent [19]
Hara et al.

[11] 3,898,184
[45] Aug. 5, 1975

[54] METHOD FOR THE PRODUCTION OF EXHAUST OR WASTE GASES PURIFYING CATALYSTS

[75] Inventors: Haruichi Hara; Shoichi Ichihara; Koichi Saito; Tomohisa Ohhata; Koshi Horie; Takashi Ohara, all of Osaka, Japan

[73] Assignee: Nippon Shokubai Kagaku Kogyo Co., Ltd., Osaka, Japan

[22] Filed: Aug. 17, 1973

[21] Appl. No.: 389,175

[30] Foreign Application Priority Data
Aug. 19, 1972 Japan.............................. 47-82457
Aug. 23, 1972 Japan.............................. 47-83658
Aug. 26, 1972 Japan.............................. 47-84988

[52] U.S. Cl............ 252/465; 252/455; 252/466 PT; 252/470; 423/213.5; 423/213.7
[51] Int. Cl............................................ B01j 11/06
[58] Field of Search............... 252/465, 466 PT; 423/213.5, 213.7

[56] References Cited
UNITED STATES PATENTS

| | | | |
|---|---|---|---|
| 3,253,641 | 5/1966 | Gutzeit............................ | 252/465 X |
| 3,288,558 | 11/1966 | Briggs et al...................... | 252/465 X |
| 3,376,106 | 4/1968 | Gring et al....................... | 252/465 |
| 3,470,105 | 9/1969 | Briggs............................. | 252/465 X |
| 3,600,429 | 8/1971 | Kronig et al..................... | 252/465 |
| 3,619,127 | 11/1971 | Hass et al........................ | 252/470 X |
| 3,669,906 | 6/1972 | Koberstein et al............... | 252/470 X |
| 3,787,333 | 1/1974 | Ichihara et al................... | 252/465 |

*Primary Examiner*—Helen M. S. Sneed
*Attorney, Agent, or Firm*—Armstrong, Nikaido & Wegner

[57] ABSTRACT

A method for the production of exhaust or waste gases purifying catalysts which comprises soaking a granular activated alumina in an aqueous solution containing trivalent chromium ions and hexavalent chromium ions in a chromic atomic ratio of 1:1 to 1:20 and having an adjusted pH of 0.5 to 4.5 as to deposit the chromium compounds onto the alumina support in an amount as chromium oxide of 5 to 30 percent by weight based on the weight of the catalyst, drying and calcining the so impregnated alumina support, treating the resulting supported composition with an aqueous solution of a compound of at least one metal selected from the group consisting of palladium and platinum as to deposit the metallic compound in an amount as the metal of 0.05 to 2 g/liter-catalyst on to the supported composition and, after drying, activating the so treated supported composition. The activation is performed either by calcining the composition at a temperature of 300° to 800°C in an oxidative atmosphere or by heating it at a temperature of 80° to 250°C in the presence of a vapourized organic reducing agent.

16 Claims, No Drawings

METHOD FOR THE PRODUCTION OF EXHAUST OR WASTE GASES PURIFYING CATALYSTS

This invention relates to an exhaust or waste gases purifying catalyst and a method for the production thereof and, particularly, to a catalyst comprising chromium oxide and either palladium or platinum supported on an activated alumina support and being used for purification of exhaust or waste gases from internal combustion engines and general industrial plants by complete oxidation thereof and a method for the production of the aforesaid catalyst.

The recent spread of motorization is a leafing cause for air pollution especially in city zones and, therefore, there is a demand for regulations on the quantities of organic substances and carbon monoxide in exhaust gases resulting from imperfect combustion of fuels in internal combustion engines. It is, however, very difficult to eliminate such chemical substances in a physical method, so that some chemical methods have been adopted and as a representative a catalytic process for complete combustion of carbon monoxide and hydrocarbons has attracted public attention.

For fully performing its function in purification of an exhaust gas from an internal combustion engine, especially of an automobile engine exhaust, a catalyst should satisfy some other conditions than has a sufficient purifying ability. Namely, from an aspect of practical use, the catalyst is required, with respect to activity, (1) to be active at a low temperature, (2) to have a good thermal resistance and (3) to retain its original activity for a long working time and, with respect to physical and chemical properties, to have a good durability indicated by, e.g., high attrition resistance and crush strength and a low shrinkage. The severe requirements of mechanical durability for the auto exhaust catalyst different by far from the requirements of activity and durability for the ordinary catalysts which will be used only in chemical reaction in a stationary plant, are attributable to that the catalyst is mounted to a vibrating body termed automobile. The requirements of physical durability will be fulfilled by preparing a catalyst itself in a heavy, tight and rigid state. Such a catalyst however has a large heat capacity owing to its increased specific gravity and, consequently, needs an elongated time for it being heated by heat supplied under a defined condition from a low temperature to an elevated temperature at which it becomes sufficiently active to initiate reaction. In other words, as a shortcoming, such a catalyst has a poor low temperature activity. Thus, it is difficult to provide a catalyst combining a high chemical activity and a good physical durability without any sacrifice.

A number of oxidation catalysts have been known, but none of them is sufficiently satisfactory as a completely oxidizing catalyst for purification by complete oxidation of vapourized solvents in waste gases exhausted from a enameled wire baking furnace, a resin-coated steel sheet baking furnace or an offset printing press or for deodorization and purification of waste gases containing harmful, irritative organic compound such as formaldehyde as exhausted from synthetic fiber and synthetic resin manufacturing plants, waste gases exhausted from a plant for the preparation of phthalic anhydride, maleic anhydride and like organic compounds by catalytic vapor phase oxidation and other industrial manufacturing plants.

Hitherto, in U.S. Pat. No. 3,470,105, there has been disclosed a catalyst prepared by impregnating a pelletized support, such as of alumina or silica-alumina, with a chromia salt solution to deposite 1 to 20 percent by weight of chromia on the support, drying the wet support, reimpregnating the support with a solution containing a cobalt salt and a palladium salt to deposite 4 to 16 percent by weight of cobalt oxide and 0.01 to 0.1 percent by weight of palladium, drying the wet support and calcining the dried support at about 760°C. However, the cobalt used in the catalyst is expensive and not abundant in resources.

In U.S. Pat. No. 3,619,127, there has been disclosed a method for purifying exhaust gases by contacting the said gases in a converter with a catalyst comprising a blend in a prescribed proportions of discrete separate particles of a group VIb metal oxide supported on a inert carrier such as alumina and of a group VIII noble metal supported on an inert support such as alumina. In the specification, there is also described a catalyst prepared by impregnating a support with a chromia salt solution, calcining the impregnated support to deposite chromia and depositing a platinum compound to the calcined support, as a comparative example. However, the catalyst prepared in the process as disclosed in the specification is poor in adhesion between the catalytic components and the support. And, in addition, the method as disclosed in the specification has a drawback that, since the catalyst system used in the method comprises a mechanical blend of a chromia catalyst supported on an alumina support and a platinum catalyst supported on a separate alumina support packed in a converter, the two granular catalysts will separate, if there is a different in bulk density between them, with elapse of time to vary the catalytic efficiency or ability of the system. Though it also is described in the specification to prepare a catalyst by depositing chromia and platinum metal to separate portions and molding the mixed powder into pellets, the pelletized catalyst thus obtained inevitably has a high bulk density.

Accordingly, an object of the present invention is to provide an improved catalyst for use in purification of exhaust gases from internal combustion engines or of waste gases from industrial manufacturing plants and a method for the production of it.

Another object of the present invention is to provide an exhaust gas purifying catalyst having a good durability and a method for the production of it.

A further object of the present invention is to provide an exhaust gas purifying catalyst having a good physical durability and capable of retaining its original high activity for a long working time, and a method for the production thereof.

A still further object of the present invention is to provide an exhaust or waste gases purifying catalyst which is not restricted by its resources and is inexpensive, and a method for the production thereof.

In accordance with the present invention, an exhaust or waste gases purifying catalyst is produced by soaking a granular activated alumina as a support in an aqueous solution containing trivalent chromium ions and hexavalent chromium ions in a chromic atomic ratio of 1:1 to 1:20 and having an adjusted pH of 0.5 to 4.5 to deposit thereon chromia compounds in a total amount corresponding to 5 to 30 percent by weight of chromia to the catalyst, drying the chromium compound deposited support, calcining the dried support, treating the calcined support with an aqueous solution of a compound of at least one metal selected from the group consisting of palladium and platinum to deposit thereon the compound in an amount corresponding to 0.05 to 2 g/liter-catalyst, drying the treated support and activating the dried supported catalyst. The activation is performed by calcining the dried supported catalyst at 300° to 800°C in an oxidative atmosphere or heating it at 80° to 250°C in the presence of a vaporized organic reducing agent.

We have found that the adhesion between a chromia and an activated alumina support is enhanced by supporting the chromia on the activated alumina in such a manner, to enhance the mechanical durability of the supported catalyst to a great extent. A catalyst thus produced by supporting chromia and either palladium or platinum on an activated alumina support in this manner has an excellent purifying ability and a high mechanical strength, so that it is of great value as a completely oxidizing catalysts for purification of exhaust gases from internal combustion engine of automobile and, in addition, for waste gases exhausted from general industrial plants, e.g. purification of exhaust gases from enameled wire baking furnaces, resin-coated steel sheet baking furnaces and off-set printing presses by complete oxidation of vaporized solvents contained therein and deodorizing and purification of waste gases containing formaldehyde or like harmful, irritative organic compounds as exhausted from synthetic fiber and synthetic resin manufacturing plants and waste gases exhausted from the process for producing phthalic anhydride, maleic anhydride and like organic compound by catalytic vapor phase oxidation.

The term activated alumina used in the present invention means alumina in transition state from aluminum hydroxide to alpha-alumina in the course of calcination of aluminum hydroxide to alpha-alumina, usually termed gamma-alumina including alumina in crystal form of gamma, pseudo-gamma, rho, eta, delta, khei, kappa and theta, and aluminum compounds capable of being converted to alumina of the aforesaid crystal form by heat treatment, such as, e.g., bayerite, boehmite, pseudo-boehmite and diaspore. The activated alumina may be used as a support in a spherical, cylindrical, nodulated or other pelletized form of a size of 2 to 5 mm.

A pelletized activated alumina having a total pore volume of 0.4 to 0.7 cc/g of pores of diameters not exceeding 100 micron, of which at least 70 percent are of diameters not exceeding 0.5 micron, most desirably pores of diameters of 0.1 to 0.5 micron amount to 20 to 50 percent and ones of diameters of 0.01 to 0.05 micron amount to 30 to 70 percent of the total pore volume, as determined by a mercury penetrating method, is particularly desirable for use as the support in the present invention since such an activated alumina gives a catalyst having further improved purifying ability, especially against hydrocarbons, and stability.

The first characteristic feature of the present invention consists in a process for supporting chromia on an alumina support. The following processes have generally been known as processes for supporting chromia on alumina support, though they all have certain drawbacks:

I. Precipitation process:

For instance, to an aqueous solution of a soluble chromium compound such as chromium nitrate there is added as a precipitant an aqueous alkaline solution such as an aqueous ammonia to form a slurry and the slurry is mixed with a powdered activated alumina and pelletized. The catalyst thus obtained, however, is by far inferior in practicality to the catalyst as prepared in the following impregnation process (II) because of a low efficiency in the production of the pelletized catalyst itself and a low attrition resistance of the pelletized catalyst.

II. Impregnation process:

(II - A) Chromium nitrate impregnation process

This process is generally employed for supporting heavy metal oxides on supports, but has the drawback that it is difficult to support a large amount of a heavy metal oxide on a support, that the bond strength of a metal oxide to a support is lowered by the action of gaseous nitrogen oxides $NO_x$ generated on calcination of an impregnated support to decompose the nitrate into the oxide and that, when chromia is deposited in a relatively large quantity on a support, it is apt to separate from the support.

(II - B) Ammonium bichromate solution impregnation process

It is difficult to deposit a large amount of chromia from an ammonium bichromate solution because of a low solubility of ammonium bichromate and of formation of needles of ammonium bichromate in the subsequent drying step which decompose during calcination with liberating a large quantity of gases in accordance with the following equation

$$(NH_4)_2Cr_2O_7 \rightarrow Cr_2O_3 + 4H_2O + N_2$$

so that chromia formed on the support is apt to separate therefrom, if it was possible to deposit adherent chromia on the surface of the support, the bond strength between the chromia and support is very weak.

(II - C) Chromic anhydride impregnation process

It is possible to support chromic anhydride in a high concentration on a support because of a high solubility of chromic anhydride, while this process has a drawback that it is difficult to obtain a supported chromia catalyst having a good and uniform activity because chromic anhydride passes during drying and calcining steps through various polymerization stages, i.e. stage of bichromic acid, trichromic acid and polychromic acid until it becomes stable chromia.

And, in general, the catalysts obtained in the impregnation processes (II) are observed to be poor in physical stability and in attrition resistance and it is necessary for obtaining an useful catalyst containing at least 15 percent by weight of uniformly deposited chromia in the impregnation process to repeat impregnation several times. Thus, the impregnation process is not satisfactory with respect to durability and to uniformity.

The present invention aims as its purpose to eliminate such various drawbacks as in the known supported chromia catalysts and especially to enhance the bonding strength between chromia and alumina support, and consists in a method of firmly supporting chromia on an alumina support comprising soaking an activated alumina support in an aqueous chromium compound solution containing dissolved therein both trivalent chromium ions and hexavalent chromium ions to deposite a water insoluble chromium compound on the surface of the said support through interaction between alumina and chromium ions and activating the deposit after drying. Accordingly, the supported chromium oxide composition obtained in the method of the present invention has an extremely high attrition resistance the value of which varies little as the supported amount of chromia is increased and, even though the supported amount of chromia is little, it exhibits a high catalytic activity since there does not take place the phenomenon of nodular deposition of chromia as traditionally said but chromia is uniformly deposited over the surface of the support.

The supported chromia-alumina composition is prepared in the following procedure.

Namely, at first, an aqueous solution containing trivalent chromium ions and an aqueous solution containing hexavalent chromium ions are mixed together and the pH of the resulting mixed solution is adjusted to a range of 0.5 to 4.5, preferably of 0.8 to 3.6, because at a pH below 0.5 it is difficult to form precipitation of chromium chromate because of its high solubility in the solution and, on the other hand, at a pH above 4.5 the solution is unstable and results in a weak deposited film of a chromium oxide. The compound yielding trivalent chromium ions in the solution includes chromium nitrate, chromium sulfate, chromium chloride, chromium bromide and the like, though the preferred is chromium nitrate. The compound yielding hexavalent chromium ions includes chromic anhydride, ammonium chromate, ammonium bichromate and the like, though preferably used is ammonium bichromate. The atomic ratio of trivalent chromium ions to hexavalent chromium ions will range preferably from 1:1 to 1:20 with 1:1.5 to 1:15 generally being optimum.

In the aqueous mixed chromium salt solution thus prepared there is then soaked a granular support of activated alumina. The mixed chromium salt solution preferably is used in an amount of 0.5 to 10 times the volume of the support, more desirably of 1 to 3 times by volume. The soaking is carried out at a temperature of 20° to 100°C, and while it varies depending also on the concentration of the solution, for 10 minutes to 40 hours preferably 1 to 6 hours with or without stirring to deposit the aforesaid chromium compound on the activated alumina support. When the chromium compound has been deposited as desired, the support is taken out of the solution and, as it is or after washed with water if necessary, dried and calcined in air at a temperature of 300° to 800°C, preferably 400° to 650°C for 0.5 to 15, preferably 1 to 6 hours. The supported chromium oxide-alumina composition thus obtained contains 5 to 30, preferably 7 to 20 percent by weight of chromia based on the weight of the catalyst.

On the preparation of the aforesaid soaking solution in the present invention it is important to adjust its pH to a value within the aforesaid range prior to soaking therein of an activated alumina support as to avoid formation of precipitate or suspensoid therein. From this point of view, a combination of chromium nitrate and ammonium bichromate is the most desired. It is necessary to adjust the pH of the solution by means of e.g. aqueous ammonia when there is used a strongly acidic compound such as chromic anhydride as a source of hexavalent chromium and, on the other hand, it is necessary to adjust the pH by addition of nitric acid when there is used as a source of trivalent chromium a compound having a stronger alkalinity than ammonium bichromate, such as ammonium chromate. As the pH modifier there may be used, other than ammonia, e.g. methylamine, ethylamine, isopropylamine ethanolamine, isopropanolamine and like organic basic compounds and, other than nitric acid, e.g. acetic acid, malonic acid, succinic acid and like organic acids.

It is known that a mixture of hexavalent chromium ions and trivalent chromium ions generally forms precipitation of chromium chromate at a pH of about 7 but the precipitate is redissolved by addition of nitric acid to adjust the pH to 3.6 or below, whereas, when an activated alumina is added to the solution, a chromium compound precipitates again on the surface of the alumina, and the reprecipitated chromium compound fortunately is baked firmly on to the surface of the support to form a stable uniform chromia film without frost-like deposition of crystals or dispersion of chromia with thermal decomposition as observed in the prior impregnation processes when it is dried and calcined into chromia.

According to our discovery, the chromium compound deposited on an activated alumina upon soaking the support in the soaking solution is a mixture comprising mainly of chromium bichromate $Cr_8O_{21}$ and chromium chromate $Cr_5O_{12}$, and forms a firmly bonded deposit on the activated alumina support and, especially a deposited film containing a major proportion of chromium bichromate is hardly soluble even in a dilute nitric acid and forms a firmly bonded film of chromia on the support when calcined.

The composition comprising chromia firmly supported on an activated alumina thus obtained is then treated with an aqueous solution of a compound of at least one metal selected from the group consisting of palladium and platinum to apply the metallic compound in an amount corresponding to 0.05 to 2 g-metal/liter-catalyst, dried and activated to obtain a finished catalyst.

Though the palladium and platinum compounds suitable for use in the practice of the present invention may be exemplified by palladium nitrate, palladium oxalate, palladium acetate, palladium aminehydroxide, palladium chloride, platinum nitrate, platinum aminehydroxide, chloroplatinic acid and like water-soluble inorganic and organic salts of palladium and platinum, there may also be used any of other palladium and platinum compounds, such as colloidal palladium hydroxide, provided that it does not contaminate the final catalyst by phosphorus, sulfur or like poisonous element and can be uniformly deposited on the support.

The activation of the catalyst supporting the aforesaid metal may be attained by calcining it at a temperature of 300° to 800°C, preferably of 400° to 600°C for 0.3 to 10, preferably 0.5 to 3 hours in an air or like oxidative atmosphere, though, in case where the amount of the aforesaid compound supported is relatively small, the catalyst preferably is activated by reduction in the following manner. Namely, in the method of the present invention, the reduction of palladium or platinum is not performed by using hydrogen, a common reducing agent, but performed by heating it at 80° to 250°C, preferably 100° to 200°C for 5 minutes to 24 hours, preferably 30 minutes to 10 hours using a reducing agent exhibiting a reducing power at a lower temperature than hydrogen, such as formalin, formic acid or hydrazine. In accordance with this process, palladium or platinum deposits in the form of finely divided metallic palladium or platinum on the surface of the final catalyst to give a final catalyst having an enhanced efficiency compared with one prepared by reduction with hydrogen at a higher temperature, because, in this process, the deposited palladium or platinum compound is reduced with retaining its well dispersed state. It is another feature of the present invention not to use such a reducing agent in liquid state and to perform the reduction by the aid of a reducing agent in vapour state, and, even if a reducing agent is applied in liquid state, the soaking of a supported catalyst composition in the liquid reducing agent should be confined to a short time as to prevent the supported palladium or platinum compound from exudation and, after taken out of the liquid reducing agent, the catalyst composition is heated to vaporize the reducing agent and to effect reduction by means of the vaporized reducing agent.

In the method of the present invention, alkali metal and like ordinary reducing assistant must not be used because residue of such an assistant has an adverse effect on the catalytic activity and it is difficult to completely eliminate the residue by washing. As the reducing agent there may also be used hydroxylamine, acetaldehyde, formamide, acrolein, methacrolein and the like other than the aforesaid formalin, formic acid and hydrazine, though the most suitably used is formalin. In the reducing step, the palladium or platinum compound only is reduced and chromia is not influenced at all to form a finely divided metallic palladium or platinum uniformly supported on the chromia film.

The present invention will be illustrated in more detail by the following examples including comparative ones.

EXAMPLE I

An impregnating solution having a pH of 2.0, maintained at 80°C, was prepared by putting 10.2 g of chromium nitrate and 20.8 g of ammonium bichromate in an 1 liter beaker and adding thereto 300 cc of water to form a solution. In the impregnating solution there was soaked 200 cc of a granular activated alumina support of an average diameter of 3.3 mm, SAS Alumina supplied by Keiser Co. USA. After intermittently stirring the impregnating mixture for 2 hours to effect deposition of a chromium compound on the support, the support was taken out of the solution, dried in air and then at 105°C for 4 hours and finally calcined at 600°C for 4 hours in air. The amount of chromia supported on the support was 11.1 percent by weight of the catalyst. On the supported chromia composition there was poured 80 cc of an aqueous palladium nitrate solution containing 0.07 g of palladium as metal, and the mixture was vaporized to dryness with uniformly impregnating the solution into the composition on an evaporating dish to deposit palladium nitrate. The supported composition was then calcined at 500°C for 5 hours in air to obtain a final catalyst containing palladium in an amount of 0.35 g/liter-catalyst.

A total of 100 cc of the catalyst thus obtained was put in a cylindrical wire netting of 10 mesh (based on Tyler Standard Sieve) having a diameter of 100 mm and a length of 100 mm and the cylindrical wire netting was rotated at a rate of 100 r.p.m. for 4 hours for an attrition test on the catalyst by frictional contact between particles of the catalyst. The attrition loss based on the weight of the catalyst (hereinafter it will be referred for short as attrition loss.) was 0.20 percent by weight.

EXAMPLE II

Each 200 of spherical activated alumina of an average diameter of 3.3 mm and cylindrical alumina of a diameter of 3 mm and a length of 4 to 5 mm, having physical properties as indicated in the following Table 1, were soaked in the impregnating solution as prepared in Example I to deposite a chromium compound thereon and, thereafter, dried and calcined in the same manner as in Example I. The amount of chromia supported on each support was in the range of 11.0 to 11.2 percent by weight. Each of the supported chromia compositions thus obtained was impregnated with 80 cc of an aqueous palladium nitrate solution containing 0.04 g of palladium as metal in the same manner as in Example I, and the resulting supported composition was heated at 130°C for 30 minutes in a circulating stream of gaseous nitrogen containing evaporated therein 30 cc of a formalin (a solution of 37 wt. percent of formaldehyde gas in water) and then in air stream at the same temperature for elimination of formaldehyde to obtain a final catalyst. The catalyst contained palladium in an amount or concentration of 0.2 g/liter-catalyst. Determined in the same manner as in Example I, the attrition losses of the catalysts obtained all were 0.15 to 0.20 % by weight.

Table 1

| Support | Pore size distribution* (%) | | | | | Total pore volume* of pores of 100 $\mu$ or less (cc/g) | Bulk density (g/cc) |
| --- | --- | --- | --- | --- | --- | --- | --- |
| | 100-1$\mu$ | 1-0.5$\mu$ | 0.5-0.1$\mu$ | 0.1-0.05$\mu$ | 0.05-0.01$\mu$ | | |
| A | 0.8 | 0.0 | 33.4 | 18.8 | 47.0 | 0.647 | 0.49 |
| B | 7.1 | 8.1 | 39.4 | 15.1 | 30.3 | 0.594 | 0.53 |
| C | 1.4 | 0.5 | 22.1 | 6.7 | 69.3 | 0.693 | 0.66 |
| D | 14.3 | 9.5 | 22.2 | 4.8 | 49.2 | 0.254 | 0.71 |
| E | 65.1 | 9.9 | 10.9 | 3.7 | 10.4 | 0.384 | 0.59 |

*Measured by a 60,000 psig mercury porosimeter made by AMINCO.

Example III

An impregnating solution of a pH of 2.0 was prepared by dissolving 255 g of chromium nitrate and 520 g of ammonium bichromate in 7.5 litres of water, then soaked therein 5 litres of a support A as indicated in the above Table 1. The temperature of the solution was of 25°C and, since at this temperature a chromium composition deposited at a too low rate, the soaking was continued for about 20 hours, with intermittently stirring, and the support was taken out of the solution, dried and calcined in the similar manner as in Example I to obtain a supported chromia composition of which the concentration of chromia supported on the activated alumina support was in average 9.4 percent by weight. On the chromia-supporting composition there was supported palladium nitrate in the same manner as in Example I, and the composition was then subjected to reducing treatment by means of formalin in the same manner as in Example II to obtain a final catalyst containing palladium in an amount in average of 0.2 g/litre-catalyst. When tested in the same manner as in Example I, the attrition loss was 0.2 percent by weight.

Example IV

A total 800 cc of a support A as indicated in the Table 1 was soaked in an impregnating solution of a pH of 1.9 prepared by dissolving 122.4 g of chromium nitrate and 57.6 g of ammonium bichromate in 1.6 litres of water, maintained at 80°C. Under the condition, the deposition of a chromium compound on the support was carried out for 2 hours in the similar manner as in Example I and the support was then dried and calcined in the similar manner as in Example I. The concentration of chromia supported on the activated alumina support was 12.1 percent by weight. On the chromia-supporting composition there was supported from palladium nitrate in the similar manner as in Example I palladium in a concentration of 0.5 g/litre-catalyst, and the support was dried at 100°C for 5 hours and then subjected to the following activating treatment to obtain four final catalysts:

1. A total 200 cc of the supporting composition was calcined at 500°C for 3 hours in air.
2. A total 200 cc of the supporting composition was subjected to reduction into palladium by means of formalin in the same manner as in Example II.
3. A total 200 cc of the supporting composition was impregnated with a 90 wt. percent aqueous formic acid solution by soaking it in the formic acid solution at 25°C for 1 minute, and then kept at 120°C for 3 hours in a drier to effect reduction by means of formic acid in vapor state.
4. A total 200 cc of the supporting composition was impregnated with an 80 wt. percent aqueous hydrazine hydrate solution by soaking it in the solution maintained at 25°C for 1 minute and then kept at 120°C for 2 hours in a drier to effect reduction into palladium by hydrazine in vapor state to obtain a final catalyst.

All the attrition losses determined on the four final catalysts in the same attrition test with Example I were 0.65 to 0.8 percent by weight.

Example V

An 1 litre beaker was charged with 4.64 g of chromium nitrate and 28.2 g of ammonium chromate, then added thereto 300 cc of water and subsequently 15 cc of a conc. nitric acid of a strength of 67 percent by weight to effect complete solution. The solution was heated to 85°C and soaked therein 200 cc of a support B as indicated in the Table 1. The pH of the impregnating solution was of 1.6. Under the condition, the deposition of a chromium compound on the support was carried out for 2 hours in the similar manner as in Example I and the chromium compound deposited support was then dried and calcined in the similar manner as in Example I to obtain a chromia-supporting composition. The concentration of chromia supported on the activated alumina support was 11.5 percent by weight. The chromia-supporting composition was treated with 80 cc of an aqueous palladium oxalate solution containing the palladium salt in an amount corresponding to 0.05 g of metallic palladium in the manner as in Example I and then subjected to reduction to palladium by means of formalin in the similar manner as in Example II to obtain a final catalyst containing palladium in a concentration of 0.25 g/litre-catalyst. The attrition loss determined on the catalyst in the test method as in Example 1 was 0.7 percent by weight.

EXAMPLE VI

An 1 litre beaker was charged with 19.0 g of chromium nitrate and 21.0 g of ammonium chromate, then added thereto 300 cc of water and 4.8 cc of a 67 wt. percent conc. nitric acid to effect complete solution. The solution was heated to 85°C, and soaked therein 200 cc of a support B as indicated in the Table 1. The pH of the impregnating solution was of 3.0. Under this condition was carried out deposition of a chromium compound for 3 hours in the similar manner as in Example I, and the chromium compound deposited support was then dried and calcined in the similar manner as in Example I. The concentration of chromia supported on the activated alumina support was 11.5 percent by weight. To the chromia-supporting composition there was applied by spraying 50 cc of an aqueous palladium nitrate solution containing the palladium salt in an amount corresponding to 0.2 g of metallic palladium. The composition was then dried at 100°C for 5 hours and calcined at 500°C for 5 hours in air to obtain a final catalyst containing palladium in a concentration of 1.0 g/litre-catalyst. The attrition loss determined on the catalyst in the same attrition test as in Example I was 0.8 percent by weight.

EXAMPLE VII

In an impregnating solution prepared by dissolving 9.3 g of chromium nitrate and 46.8 g of ammonium bichromate in 300 cc and heated to 85°C there was soaked 200 cc of a support C, listed in the Table 1. The pH of the impregnating solution was of 2.1. Under this condition, deposition of a chromium compound was carried out for 2 hours in the similar manner as in Example I, and the chromium compound deposited support was then dried and calcined in the similar manner as in Example 1. The concentration of chromia supported on the activated alumina support was 20.2 percent by weight. The chromia-supporting composition was sprayed with 50 cc of an aqueous palladium nitrate solution containing the salt in an amount corresponding to 0.2 g of metallic palladium in the similar manner as in Example VI, dried, soaked for 1 minute in a formalin at 25°C to impregnate therewith the formalin and kept in a drier at a temperature of 120°C for 3 hours to effect reduction into palladium by means of formaldehyde to obtain a final catalyst containing palladium in a concentration of 1.0 g/litre-catalyst. The attrition loss determined on the catalyst by the same attrition test as in Example I was 1.2 percent by weight.

EXAMPLE VIII

A solution of 4.64 g of chromium nitrate and 18.6 g of chromic anhydride in 300 cc of water was heated to 85°C, then soaked therein 200 cc of a support A, listed in the Table 1. The impregnating solution was of a pH of 0.8. After subjected to deposition of a chromium compound under the same condition in the similar manner as in Example I, the support was dried and calcined in the similar manner as in Example I. The chromia-supporting composition was then treated with a palladium nitrate solution in the similar manner as in Example I and, after drying, subjected to reduction by formalin in the similar manner as in Example II to obtain a final catalyst containing palladium in a concentration of 0.35 g/litre-catalyst. The attrition loss determined on the catalyst in the same test method as in Example I was 0.4 percent by weight.

EXAMPLE IX

On to 200 cc of a chromia-supporting composition prepared by depositing a chromium compound on a support C, listed in the Table 1, and calcining the chromium compound-supporting support in the same manner as in Example VII, there was poured 100 cc of an aqueous chloroplatinic acid solution containing platinum in an amount of 0.08 g as metallic platinum, and the mixture was uniformly vaporized to dryness to deposit the platinum compound on the composition, and the composition was, after drying, reduced by means of formaldehyde in the similar manner as in Example II to obtain a final catalyst containing supported platinum in an concentration of 0.4 g/litre-catalyst. The attrition loss determined on the catalyst in the same test method as in Example I was 1.2 percent by weight.

COMPARATIVE EXAMPLE I

In a soaking solution of a pH of 3.3 prepared by dissolving 12.4 g of ammonium bichromate in 150 cc of water and maintained at 85°C there was soaked 100 cc of a support A, listed in the Table 1. The support was treated for 2 hours under this condition in the similar manner as in Example I, dried and calcined. The concentration of chromia supported on the activated alumina support was 10.7 percent by weight. The attrition loss determined on the chromia-supporting composition, determined in the same method as in Example I, was 5.8 percent by weight.

COMPARATIVE EXAMPLE II

In an impregnating solution prepared by dissolving 76.2 g of chromium nitrate in 150 cc of water and maintained at 85°C, there was soaked 100 cc of a support A, as listed in the Table 1. The pH of the impregnating solution was of 1.4. The support was treated under this condition for 3 hours, dried and calcined in the similar manner as in Example I to obtain a chromia-supporting composition containing supported chromia in a concentration of 5.8 percent by weight of the catalyst. The attrition loss determined on the composition in the same test method as in Example I was 3 percent by weight.

COMPARATIVE EXAMPLE III

In 200 cc of water there were dissolved 2.32 g of chromium nitrate and 14.1 g of ammonium chromate and the resulting solution was maintained at 85°C. The pH value of the solution was 7.0 and there was observed in the solution precipitation of a chromium compound. In the solution under such conditions, there was soaked 100 cc of a support A, as listed in the Table 1 and, after 3 hours, the support was taken out of the solution, dried and calcined in the similar manner as in Example I. The concentration of chromia supported on the activated alumina support was 8.7 percent by weight. The attrition loss determined on the chromia-supporting composition in the same test method as in Example I was 3.0 percent by weight.

EXAMPLE X

The initial activities of the final catalysts prepared in Examples I to IX were determined in the following manner.

Namely, 10 cc of a catalyst was packed in a stainless steel reaction tube of an inner diameter of 18 mm and a gaseous mixture comprising 1 percent by volume of carbon monoxide, 500 ppm of propylene, 5 percent by volume of oxygen, 10 percent by volume of steam and the balance being nitrogen was passed therethrough at a gas temperature on the entrance end of 200° to 300°C and at a space velocity of 15,000 litre/litre/hour and, after 10 to 20 minutes when the system reached a stationary state, the effluent gas from the reaction tube was subjected to measuring of carbon monoxide by means of non-dispersive infrared gas analyser and of hydrocarbons by means of flame ionization detector gas analyser. The results obtained were set forth in the following Table 2.

Table 2

| Example No. of Catalyst | CO conversion (%) | | | | $C_3H_6$ conversion (%) | | | |
|---|---|---|---|---|---|---|---|---|
| | 200°C | 225°C | 250°C | 300°C | 200°C | 225°C | 250°C | 300°C |
| I | 11 | 92 | 100 | 100 | 9 | 80 | 94 | 98 |
| II (A) | 85 | 98 | 100 | 100 | 73 | 90 | 94 | 97 |
| II (B) | 86 | 98 | 100 | 100 | 64 | 86 | 95 | 97 |
| II (C) | 92 | 98 | 100 | 100 | 69 | 87 | 95 | 97 |
| II (D) | 49 | 100 | 100 | 100 | 18 | 90 | 94 | 97 |
| II (E) | 41 | 100 | 100 | 100 | 17 | 86 | 93 | 96 |
| III | 82 | 100 | 100 | 100 | 74 | 92 | 96 | 98 |
| IV (1) | 20 | 100 | 100 | 100 | 14 | 92 | 98 | 98 |
| IV (2) | 96 | 100 | 100 | 100 | 86 | 93 | 95 | 98 |
| IV (3) | 96 | 100 | 100 | 100 | 85 | 92 | 96 | 98 |
| IV (4) | 94 | 100 | 100 | 100 | 83 | 92 | 95 | 98 |
| V | 84 | 100 | 100 | 100 | 73 | 90 | 94 | 98 |
| VI | 25 | 100 | 100 | 100 | 15 | 96 | 98 | 98 |
| VII | 100 | 100 | 100 | 100 | 90 | 98 | 98 | 99 |
| VIII | 72 | 100 | 100 | 100 | 63 | 90 | 94 | 97 |
| IX | 100 | 100 | 100 | 100 | 91 | 94 | 98 | 99 |

The date shown in the Table 2 indicate that the catalysts prepared in Example II using support A, B or C those having desirable physical properties are superior in low temperature activity to those prepared in the same manner using support D or E having different physical properties.

EXAMPLE XI

The activities and stabilities of the catalysts prepared in Example I to IX were evaluated by the following tests using an exhaust gas from an automobile engine. Each 30 cc of the catalysts were packed in separate stainless steel reaction tubes of an inner diameter of 30 mm and an exhaust gas from a commercially available fourcylindered gasoline engine of a displacement of 1,600 cc, operated at 1,800 r.p.m. under a boost pressure of 450 mm Hg on a lead-free gasoline, was passed therethrough for purification test. Portion of the exhaust gas and a necessary amount of secondary air were mixed together in a blower and, after preheated to 400°C by means of an electric furnace, passed through the reaction tube at a rate of 15 liters/minutes for 100 hours. During the run, hydrocarbons, carbon monoxide and oxygen contained in the effluent were measured by means of MEXA-18 type analyser, made by K.K. Horiba Seisakusho. The composition of the diluted exhaust gas on the entrance of the reaction tube was: carbon monoxide 0.5 percent by volume; total hydrocarbon (calculated as $CH_4$) 2,000 ppm; oxygen 5 to 6 percent by volume; and the balance being carbon dioxide, nitrogen, water and other impurities. The catalyst temperature was 460° to 490° C. The results obtained were as summarized in the following Table 3.

1,730 ppm of cresol and 143 ppm of phenol. When the waste gas was passed at a gas temperature of 350°C at a space velocity of 20,000 litres/liter of catalyst/hour through the catalyst bed in the aforesaid converter, the concenration of each combustible matter in the waste gas was reduced to the order of trace. The determinations of combustible matters contained in the waste gas and effluent gas were made by gas chromatography.

EXAMPLE XIII

A converter was packed with a catalyst prepared in the similar procedure as in Example VI and a waste gas exhausted from a resin-coated sheet steel baking furnace was passed therethrough at a temperature of 260°C and a space velocity of 10,000 litres/litre of catalyst/hour to obtain the results as set forth in the Table 4.

Table 3

Conversion (%) of CO and of hydrocarbons

| Example No. of catalyst | O hr CO | H.C. | 10 hrs CO | H.C. | 25 hrs CO | H.C. | 50 hrs CO | H.C. | 100 hrs. CO | H.C. |
|---|---|---|---|---|---|---|---|---|---|---|
| I | 98 | 92 | 97 | 91 | 97 | 90 | 96 | 89 | 96 | 88 |
| II (A) | 98 | 92 | 98 | 92 | 98 | 90 | 97 | 89 | 97 | 88 |
| II (B) | 98 | 93 | 98 | 91 | 98 | 90 | 97 | 89 | 97 | 88 |
| II (C) | 97 | 93 | 98 | 92 | 97 | 91 | 97 | 90 | 97 | 89 |
| II (D) | 98 | 90 | 97 | 87 | 96 | 85 | 95 | 83 | 94 | 82 |
| II (E) | 97 | 89 | 96 | 88 | 95 | 84 | 93 | 82 | 91 | 81 |
| III | 98 | 93 | 98 | 92 | 97 | 92 | 97 | 90 | 97 | 88 |
| IV (1) | 98 | 93 | 98 | 92 | 97 | 90 | 97 | 88 | 97 | 87 |
| IV (2) | 99 | 93 | 98 | 92 | 98 | 91 | 98 | 91 | 98 | 91 |
| IV (3) | 99 | 94 | 98 | 92 | 98 | 91 | 98 | 90 | 98 | 90 |
| IV (4) | 99 | 93 | 98 | 92 | 98 | 90 | 98 | 90 | 98 | 88 |
| V | 98 | 91 | 98 | 90 | 98 | 90 | 98 | 88 | 98 | 86 |
| VI | 97 | 94 | 96 | 92 | 97 | 91 | 97 | 91 | 96 | 90 |
| VII | 99 | 94 | 98 | 92 | 98 | 92 | 98 | 92 | 98 | 91 |
| VIII | 99 | 92 | 98 | 91 | 98 | 90 | 97 | 89 | 97 | 87 |
| IX | 96 | 93 | 97 | 94 | 98 | 92 | 97 | 92 | 97 | 92 |

REFERENTIAL EXAMPLE

A converter was packed with 4.6 liter of the catalyst prepared in Example II and mounted to the body of an automobile having a gasoline engine of a displacement of 7,450 cc in the manner that the exhaust gas from the said engine was passed together with a necessary amount of pumped secondary air through the converter during running test, and the automobile was subjected to the mode test in accordance with 1972 Federal Test Procedure provided by United States Government to evaluate the performance of the catalyst. The emission of CO was 1.9 g/mile (corresponding to conversion of CO by the catalytic combustion of 92 percent) and of hydrocarbons was 0.09 g/mile (corresponding to conversion of hydrocarbons of 96 percent). These values are lower than the 1975 regulation by U.S.A. Government of 3.4 g/mile with respect to CO and 0.41 g/mile for hydrocarbons; this means that the catalyst of the present invention meets the aforesaid regulation.

EXAMPLE XII

A converter connected to a blower mounted on the outlet of a draught was packed with a catalyst prepared in the similar manner as in Example IV(4) for combustion test for a waste gas exhausted from an enameled wire baking furnace. The waste gas contained as combustible matters in average 1,210 ppm of naphtha, Table 4

| Combustible matter | Fresh gas | Treated gas | Removal (%) |
|---|---|---|---|
| Xylene | 854 ppm | 5 ppm | 99.4 |
| Benzene + Toluene | 186 ppm | trace | >99.9 |
| Total | 1,040 | 5 ppm | 99.5 |

EXAMPLE XIV

A catalyst prepared in the similar procedure as in Example II(A) was packed in a converter and used for purification of a waste gas exhausted from an off-set rotary press containing 2,700 ppm (in $CH_4$ equivalent) of naphtha as a combustible matter in the similar manner as in Example XII to obtain the results as summarized in the Table 5.

Table 5

| Space velocity (litre/litre-cat/hr) | Temperature (°C) 300 | 350 | 400 |
|---|---|---|---|
| 30,000 | 85.9 % | 94.5 % | 99.8HO % |
| 20,000 | 93.3 % | 99.6 % | 99.9 % |
| 10,000 | >99.99 % | >99.99 % | >99.99 % |

Analysis was made by gas chromatography.

EXAMPLE XV

A catalyst prepared in the similar procedure as in Example VII was packed in a converter and a waste gas from a tobacco manufacturing plant was passed at 400°C therethrough to obtain the following results. The deodorizing effect was evaluated by seven sensory testing panels in accordance with ASTM D1391-57.

| | |
|---|---|
| Fresh gas | Odor index 65 (strong order of tobacco) |
| Treated gas | Odor index 24 (free of tobacco odor) |
| Deodorization (%) | 63 |

EXAMPLE XVI

A catalyst prepared in the similar procedure as in Example IV(1) was packed in a coverter and a waste gas exhausted from a drying furnace for automobile painting was passed therethrough to obtain the results as summarized in the Table 6.

Table 6

| Component | 300°C | | | 350°C | | |
|---|---|---|---|---|---|---|
| | Fresh | Treated | Removal (%) | Fresh | Treated | Removal (%) |
| Butanol | 53 ppm | — | | 64 ppm | — | |
| Toluene | 122 | trace | | 149 | — | |
| Xylene | 18 | — | | 26 | — | |
| Naphtha | 117 | 1 ppm | 99.2 | 143 | trace | |
| Others | 135 | 0.4 | 99.7 | 158 | trace | |
| Total | 445 | 1.4 | 99.7 | 540 | | >99.9 |

Analysis was made by gas chromatography.

EXAMPLE XVII

A catalyst prepared in the similar procedure as in Example IX was packed in a converter and a waste gas exhausted from a vinylon fibre manufacturing plant was passed therethrough at a temperature of 250°C and at a space velocity of 10,000 litre/litre/hr to obtain the results as shown in the following Table 7.

Table 7

| | Fresh gas | Treated gas | Removal (%) |
|---|---|---|---|
| Formaldehyde | 169 ppm | 0.549 ppm | 99.67 % |

Analysis was made by photo electric colorimeter.

What is claimed is:

1. A method for the production of exhaust or waste gases purifying catalysts comprising soaking a granular activated alumina support in an aqueous solution containing trivalent chromium ions of a compound selected from the group consisting of chromium nitrate, chromium sulfate, chromium chloride and chromium bromide and hexavalent chromium ions of a compound selected from the group consisting of chromic anhydride, ammonium chromate and ammonium bichromate in a chromic atomic ratio of from 1:1 to 1:20 and having an adjusted pH of 0.5 to 4.5 to deposit thereon a chromium compound in a concentration corresponding to 5 to 30 percent by weight of chromia based on the weight of the catalysts, drying and calcining the chromium compound deposited support to form a chromia-supporting composition, treating the composition with an aqueous solution of a compound of at least one metal selected from the group consisting of palladium and platinum to deposit thereon the compound in a concentration corresponding to 0.05 to 2 g/litre-catalyst of the metal, drying the wet catalyst composition and activating the dried catalyst composition to form a final catalyst.

2. A method of claim 1 in which the activation is performed by calcining the dried catalyst composition at a temperature of 300° to 800°C in an oxidative atmosphere.

3. A method of claim 1 in which the activation is performed by heating the dried catalyst composition at a temperature of 80° to 250°C in the presence of a vaporized organic reducing agent.

4. A method of claim 1 in which the activated alumina is a granular one having a total pore volume of 0.4 to 0.7 cc/g of pores of diameters not exceeding 100 microns of which at least 70 percent are of a diameter not exceeding 0.5 micron, as determined by a mercury penetrating method.

5. A method of claim 1 in which the activated alumina is a glanular one having a total pore volume of 0.4 to 0.7 cc/g of pores of diameters not exceeding 100 microns of which 20 to 50 percent are of diameters of 0.1 to 0.5 micron and 30 to 70 percent are of diameters of 0.01 to 0.05 micron, as determined by a mercury penetrating method.

6. A method of claim 1 in which the activated alumina is in the form of granules of diameters of 2 to 5 mm.

7. A method of claim 1 in which the activated alumina support is soaked in the chromium compound containing aqueous solution at a temperature of 20° to 100°C for 10 minutes to 40 hours.

8. A method of claim 1 in which the atomic ratio of trivalent chromium ions to hexavalent chromium ions is from 1:1.5 to 1:15.

9. A method of claim 1 in which the compound yielding trivalent chromium ions is chromium nitrate and the compound yielding hexavalent chromium ions is ammonium bichromate.

10. A method of claim 2 in which the activation is performed by calcination at a temperature of 300° to 800°C in air.

11. A method of claim 3 in which the organic reducing agent is at least one compound selected from the group consisting of formalin, formic acid, hydrazine, hydroxylamine, acetaldehyde, formamide, acrolein and methacrolein.

12. A method of claim 11 in which the organic reducing agent is formalin.

13. A catalyst for the purification of exhaust or waste gases comprising a granular activated alumina support having a total pore volume of 0.4 to 0.7 cc/g of pores of diameters not exceeding 100 microns of which at least 70 percent are of diameters not exceeding 0.5 micron, as determined by a mercury penetrating method, said support supporting thereon 5 to 30 percent by weight, based on the weight of the catalyst, of chromia derived from chromium compounds containing:

a. trivalent chromium ions and
b. hexavalent chromium ions; said ions being deposited on said activated alumina support from an aqueous solution having an adjusted pH of 0.5 to 4.5 and containing a compound selected from the group consisting of chromium nitrate, chromium sulfate, chromium chloride and chromium bromide and a compound selected from the group consisting of chromic anhydride, ammonium chromate and ammonium bichromate; the chromic atomic ratio of trivalent chromium ions to hexavalent chromium ions in said solution being 1:1 to 1:20; and over said chromia there being a metal selected from the group consisting of palladium and platinum in a concentration of 0.5 to 2g/litre - catalyst.

14. A catalyst of claim 13 in which the total pore volume of pores of diameters not exceeding 100 microns is 0.4 to 0.7 cc/g and 20 to 50 percent of the total pores are of diameters of 0.1 to 0.5 micron and 30 to 70 % are of diameters of 0.01 to 0.05 micron.

15. A catalyst of claim 13 in which the catalyst is provided for use in purification of exhaust gases of internal combustion engines.

16. A catalyst of claim 13 in which the catalyst is provided for use in purification of waste gases exhausted from general industrial plants.

* * * * *